(12) United States Patent
Menahemi et al.

(10) Patent No.: US 7,478,382 B2
(45) Date of Patent: Jan. 13, 2009

(54) SYNCHRONIZED RING SOFTWARE DOWNLOAD

(75) Inventors: Zvika Menahemi, Modi'in (IL); Alex Levit, Ramat-Gan (IL); Muly Ilan, Ramat-Gan (IL)

(73) Assignee: Corrigent Systems Ltd., Tel Aviv (IL)

( * ) Notice: Subject to any disclaimer, the term of this patent is extended or adjusted under 35 U.S.C. 154(b) by 907 days.

(21) Appl. No.: 10/951,575

(22) Filed: Sep. 27, 2004

(65) Prior Publication Data

US 2006/0070058 A1 Mar. 30, 2006

(51) Int. Cl.
*G06F 9/45* (2006.01)
(52) U.S. Cl. ...................................................... 717/168
(58) Field of Classification Search .................. 717/171
See application file for complete search history.

(56) References Cited

U.S. PATENT DOCUMENTS 6,397,385 B1 * 5/2002 Kravitz ....................... 717/173
6,625,115 B1 * 9/2003 Ikeda et al. .................. 370/217
6,892,329 B2 * 5/2005 Bruckman .................... 714/43
7,006,434 B1 * 2/2006 Klein et al. .................. 370/223
2002/0144190 A1 * 10/2002 Bruckman .................... 714/43

* cited by examiner

Primary Examiner—John Chavis
(74) Attorney, Agent, or Firm—Townsend and Townsend and Crew LLP

(57) ABSTRACT

According to a disclosed embodiment of the invention, software download and installation in a ring network are synchronized in a two-stage operation in order to minimize service disruption time. In a first phase, the MPM's and UIM's in all the nodes are upgraded in parallel. Each node has two main processing modules, allowing one to be upgraded while the other continues to operate the node. In a second phase, the RIM's at the edges of a single ring segment are upgraded, one ring segment after the other, during which time each terminal node continues to operate with respect to the span connecting to its opposite side. While a span is non-operative, traffic is wrapped or diverted as necessary to maintain service of the ring. While one RIM of a node is being upgraded, the other RIM remains operational.

33 Claims, 5 Drawing Sheets

SYNCHRONIZED RING SOFTWARE DOWNLOAD

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to communications networks. More particularly, this invention relates to methods and systems for upgrading software in ring networks.

2. Description of the Related Art

The meanings of acronyms and certain terminology used herein are given in Table 1.

TABLE 1

| | |
|---|---|
| BLSR | Bi-directional line switched ring |
| EMS | Element management system |
| FRU | Field-replaceable unit |
| MPM | Main processing module |
| NE | Network element |
| OSI | Open system interconnection model |
| RIM | Ring interface module |
| RPR | Resilient packet ring |
| SDH | Synchronous digital hierarchy |
| SONET | Synchronous optical network |
| SRBC | Synchronized ring bandwidth change |
| SRDL | Synchronized ring download |
| SWDL | Software download |
| UIM | User interface module |

In ring-based networks, scalability and reliability, and in particular the ability to execute non-service affecting (hitless) software upgrades, have become critical issues, particularly for operators of converged, packet-based backbones. A normal software upgrade of a node involves reset of the RIM's (which provide the interface functions between the node and the neighboring spans (segments) of the ring). As used herein, the terms "span" and "segment" are synonymous. Thus, when upgrading several nodes in the same ring in a non-synchronized manner several ring spans can become simultaneously non-operational, which causes a long service outage. Indeed, maintaining network recovery times of 50 ms or less while applying software upgrades to network elements has been a difficult goal to meet at reasonable cost.

SUMMARY OF THE INVENTION

According to a disclosed embodiment of the invention, software download and installation in a ring network are synchronized in a two-phase operation in order to minimize service disruption time. In a first phase, the MPM's and UIM's in all the nodes are upgraded in parallel. Each node has two main processing modules, allowing one to be upgraded while the other continues to operate the node. In a second phase, the RIM's at the edges of a single ring segment are upgraded, one ring segment after the other. Thus, only a single span at a time is brought down, and the RIM's of its terminal nodes upgraded, during which time each terminal node continues to operate with respect to the span connecting to its opposite side. While a span is non-operative, traffic is wrapped or diverted as necessary to maintain service of the ring. While one RIM of a node is being upgraded, the other RIM remains operational.

The invention provides a method for performing a software upgrade in a data network in which a plurality of nodes are interconnected in a ring, the nodes each having two ring interface modules, which is carried out by downloading a software release to at least a first node, disabling a flow of data across exactly one internodal connection between one of the ring interface modules of the first node and one of the ring interface modules of a second node, installing the software release in the one ring interface module of the first node while the flow of data across the one internodal connection is disabled, and thereafter reestablishing the flow of data across the internodal connection.

In one aspect of the method, downloading the software release includes downloading to the second node, which is carried out while disabling a flow of data, by installing the software release in the one ring interface module of the second node.

In another aspect of the method, the nodes each comprise two main processing modules, and while controlling operation of one of the nodes with one of the main processing modules, the software release is installed in another of the main processing modules, and thereafter operation of the one node is controlled by another of the main processing modules and the software release is installed in the one main processing module.

In a further aspect of the method at least one of the nodes has two user interface modules, and the software release includes new software for the user interface modules. In one of the nodes, while maintaining operation of one of the user interface modules, the software release is installed in another of the user interface modules, and thereafter enabling the other user interface module. The software release is then installed in the one user interface module.

One aspect of the method includes appointing a server node from among the nodes, and synchronizing downloading and installation of the software release by transmitting commands from the server node to the nodes, the software release being downloaded and installed responsively to the commands.

The invention provides a computer software product, including a computer-readable medium in which computer program instructions are stored, which instructions, when read by one or more processors in nodes of a data network, wherein the nodes are connected in a ring, each of the nodes having two ring interface modules, cause the processors to execute a method for performing a software upgrade in the nodes, the method being carried out by downloading a software release to at least a first node, disabling a flow of data across exactly one internodal connection between one of the ring interface modules of the first node and one of the ring interface modules of a second node, installing the software release in the one ring interface module of the first node while the flow of data across the one internodal connection is disabled, and thereafter reestablishing the flow of data across the internodal connection.

The invention provides a communications apparatus including a data network having a plurality of nodes interconnected in a ring, each of the nodes having two ring interface modules. Processors in the nodes are operative for performing a method for a software upgrade in the nodes, which is carried out by downloading a software release to at least a first node, disabling a flow of data across exactly one internodal connection between one of the ring interface modules of the first node and one of the ring interface modules of a second node, installing the software release in the one ring interface module of the first node while the flow of data across the exactly one internodal connection is disabled, and thereafter reestablishing the flow of data across the internodal connection.

The invention provides a method for performing a software upgrade in a data network having a plurality of nodes interconnected in a ring, each node having two ring interface modules, spans of the ring being defined by a direct internodal connection between an eastern ring interface module of a first node and a western ring interface module of a second node, The method is carried out by downloading a software release to the first node and the second node of at least one of the spans, and while maintaining operation of the western ring interface module of the first node and the eastern ring interface module of the second node of the span, installing the software release in the eastern ring interface module of the first node and in the western ring interface module of the second node of the one span.

In an aspect of the method the nodes each have two main processing modules, and the software release includes new software for the main processing modules. The method is further carried out while maintaining operation of the ring interface modules and one of the main processing modules in one of the nodes by installing the software release in another of the main processing modules, and thereafter enabling the other main processing module and installing the software release in the one main processing module.

In still another aspect of the method installing the software release in the main processing modules includes resetting the main processing modules.

In one aspect of the method the nodes each have two main processing modules. At least one of the nodes has a user interface module, and the software release includes new software for the user interface module. The method is further carried out while maintaining operation of the ring interface modules and one of the main processing modules in one of the nodes and installing the software release in the user interface module.

In another aspect of the method at least one of the nodes has two user interface modules including a working user interface module, and a standby user interface module, and the software release includes new software for the working user interface module. The method is further carried out while maintaining operation of one of the user interface modules in one of the nodes, and installing the software release in another of the user interface modules, and thereafter enabling the other user interface module, and installing the software release in the one user interface module.

In a further aspect of the method installing the software release in the user interface modules includes resetting the user interface modules.

The invention provides a computer software product, including a computer-readable medium in which computer program instructions are stored, which instructions, when read by one or more processors, cause the processors to perform a method for a software upgrade in a data network having a plurality of nodes interconnected in a ring, each node having two ring interface modules, spans of the ring being defined by a direct internodal connection between an eastern ring interface module of a first node, and a western ring interface module of a second node. The method is carried out by downloading a software release to the first node and the second node of at least one of the spans, and while maintaining operation of the western ring interface module of the first node and the eastern ring interface module of the second node of the span, installing the software release in the eastern ring interface module of the first node and in the western ring interface module of the second node of the one span.

The invention provides a communications apparatus including a data network having a plurality of nodes interconnected in a ring, the nodes each having two ring interface modules. Spans of the ring are defined by a direct internodal connection between an eastern ring interface module of a first node, and a western ring interface module of a second node. Processors in the nodes are operative for performing a software upgrade in the nodes, which is carried out by downloading a software release to the first node and the second node of at least one of the spans, and while maintaining operation of the western ring interface module of the first node and the eastern ring interface module of the second node of the one span, installing the software release in the eastern ring interface module of the first node and in the western ring interface module of the second node of the span.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

Overview.

Figure 1:
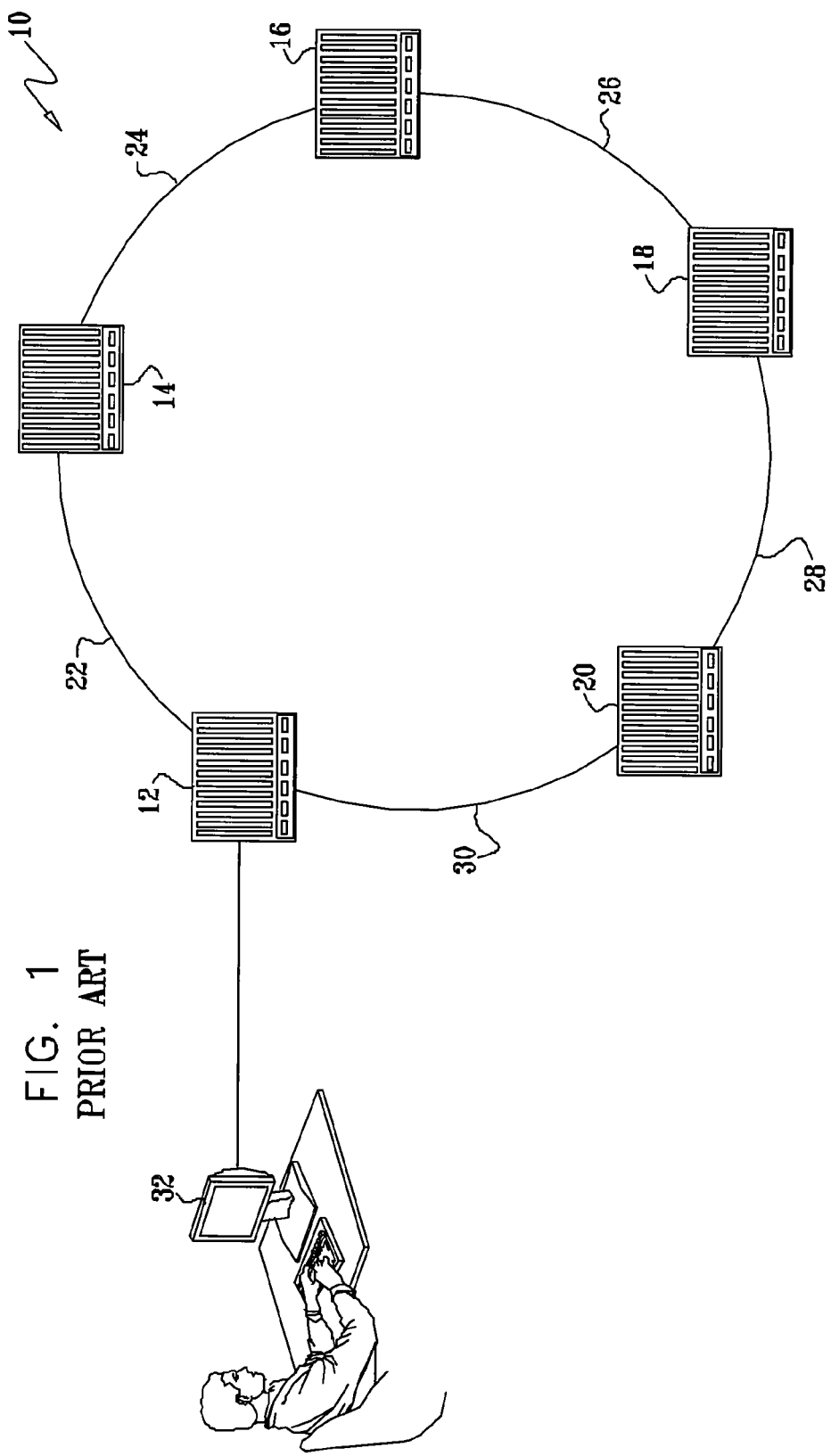
FIG. 1 is a schematic illustrating a portion of a data network, which is operative in accordance with a disclosed embodiment of the invention.

Turning now to the drawings, reference is initially made to FIG. 1, which is a schematic diagram of a portion of a data network 10 that is operative in accordance with a disclosed embodiment of the invention. The data network 10 is configured as a ring formed of nodes 12, 14, 16, 18, 20, linked by spans 22, 24, 26, 28, 30. Although five nodes are shown representatively in FIG. 1, the invention can be practiced with rings comprising any number of nodes. The data network 10, could be an OSI layer-2 ring, such as a RPR ring, or a ring network in other OSI layers. The node 12 is linked to a management workstation 32. The ring may use any protocol, e.g. Sonet, SDH, Ethernet, RPR, Token-Ring, so long as the protocol provides protection against failure of any single ring span. This protection may be implemented in one or more layers of the OSI model, e.g., layer-1 protection using Sonet BLSR, layer-2 protection using RPR over Ethernet. Traffic may be routed in an easterly or westerly direction around the ring. The terms "easterly" and "westerly" are used arbitrarily herein to distinguish the different ring traffic directions. These terms have no physical meaning with respect to the actual configuration of the network. A typical node is composed of a chassis holding a main processing module, several user interface modules, and two ring interface modules, all of which are field-replaceable units (FRU's).

A node may be provided with redundant hardware for protection against equipment failures. For example, there may be primary and secondary MPM's and UIM's. Since there are two RIM's, one connected to the eastern side of the ring, and the other to the western side, they protect each other. Thus, no additional RIM redundancy is generally necessary.

It is important to minimize service disruption time while upgrading the software of all or some of the nodes in the ring. Service outage of less than 50 ms is desirable. In typical practice, telecommunication operators are given a "maintenance window" every few weeks, i.e., a time period in which service-affecting maintenance activities are conducted. The duration of the "maintenance window" is limited. A typical duration is two hours.

Software upgrades are included in the maintenance activities that are performed in the maintenance window. A nodal software upgrade may take more than 10 minutes. It usually involves reset of the various FRU's, particularly the RIM's. 90% of nodal upgrade time is due to software upgrade of the MPM's and UIM's, and about 10% is consumed by upgrade of the RIM's.

There are several possible approaches to software upgrade of a ring:

(1) Upgrade all the nodes in parallel. This approach can result in a long service outage, because several ring spans can become simultaneously non-operational. It will be recalled that the ring protocol is designed to handle only a single span failure at a time.

(2) Upgrade the nodes sequentially, one node after the other, one node at a time. The difficulty with this approach is that the upgrade process may take a long time (N nodes×10 minutes per node). The upgrade process may be exceed the duration of the maintenance window.

(3) Synchronized ring software upgrade. This is the approach taken in the instant invention. It is a two-stage operation: In a first phase, the MPM's and UIM's in all the nodes are upgraded in parallel. This phase is referred to herein as a "partial upgrade". In a second phase, the RIM's at the edges of a single ring segment are upgraded, one ring segment after the other. This phase is referred to as a "RIM upgrade". In some embodiments, the order of the first phase and second phase may be interchanged. Indeed, the order of upgrading different FRU's can be performed in many combinations, as long as no more than one span at a time is disabled.

Figure 2:
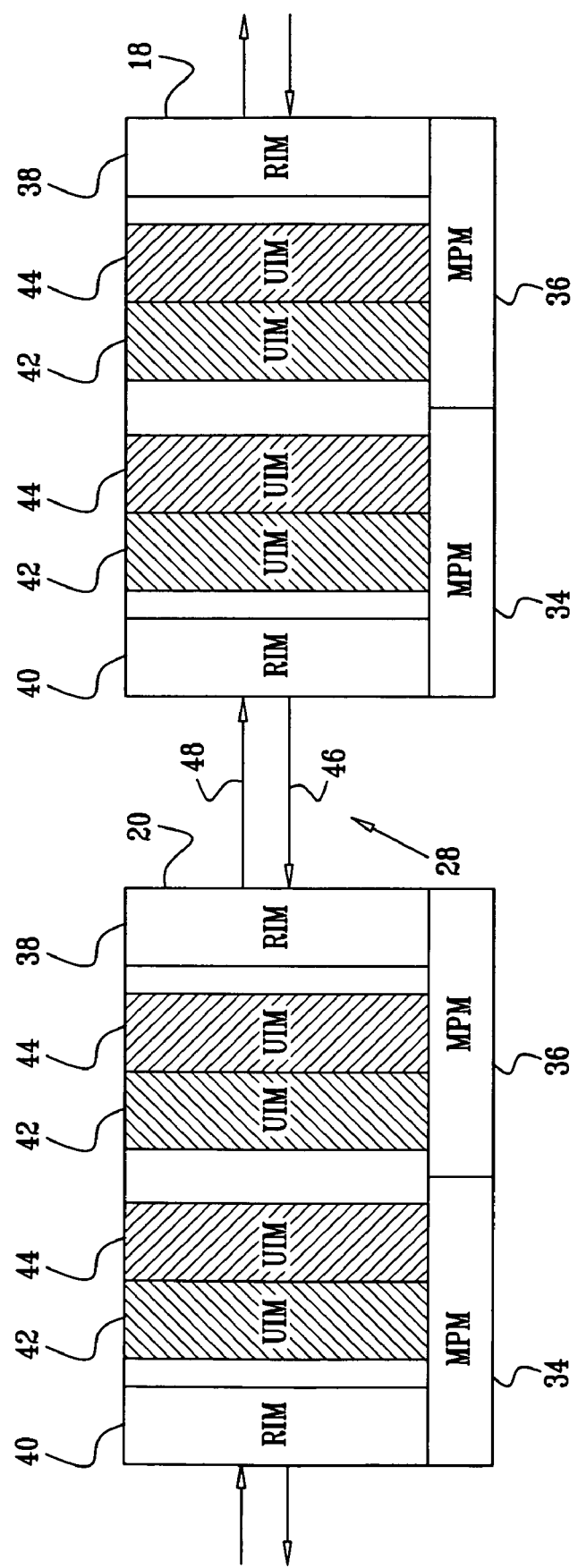
FIG. 2 is a block diagram of two representative nodes and a span of the data network shown in FIG. 1, in accordance with a disclosed embodiment of the invention.

Reference is now made to FIG. 2, which is a more detailed block diagram of two representative nodes 18, 20 of the data network 10 and the span 28 (FIG. 1), in accordance with a disclosed embodiment of the invention. The node 18 has a main processing module 34, a secondary main processing module 36, a western ring interface module 38, and an eastern ring interface module 40. The node 18 also has a primary user interface module 42 and a secondary user interface module 44. The main processing modules 34, 36 provide fault tolerance for the node 18, and each requires MPM program instructions to function. The western ring interface module 38, and the eastern ring interface module 40 operate using RIM program instructions. Typically, the MPM program instructions and RIM program instructions are realized as software. The node 20 is configured with the same facilities as the node 18, having a primary main processing module 34, a secondary main processing module 36, a western ring interface module 38, and an eastern ring interface module 40. The node 20 also has a primary user interface module 42 and a secondary user interface module 44.

Multiple pairs of user interface modules 42, 44 may be present in a node. While the exemplary nodes 18, 20 are identically configured, each having two pairs of user interface modules 42, 44, in general this need not be the case. Indeed, one node at the end of a span may have no user interface modules at all, while a node at the other end of the span may have several user interface modules. In general, a user interface module connects a ring network element to an external network. The span 28 includes an internodal connection between the western ring interface module 38 and the eastern ring interface module 40, shown as links 46, 48 for eastbound and westbound traffic, respectively, entering and leaving the nodes 18, 20. As used herein the term "internodal connection" encompasses a provision for bi-directional traffic flow between two nodes, whether embodied as a single physical link or a plurality of physical links.

It is assumed that the following conditions apply to the nodes 18, 20, and indeed, to all nodes of the data network 10 (FIG. 1). If the MPM software, the RIM software, or both in one of the nodes 18, 20 is a newer software release, and the corresponding software of the other one of the nodes 18, 20 is an older software release, the two nodes 18, 20 remain interoperable for purposes of internal ring functions. Within a node, a MPM having a newer software release is able to manage a RIM having an older software release. Furthermore, within a node, if one RIM has a newer software release, and the other RIM has an older software release, the two RIM's are interoperable. Lastly, every node of the data network 10 contains two MPM's.

SRDL—Process Flow Chart.

Figure 3:
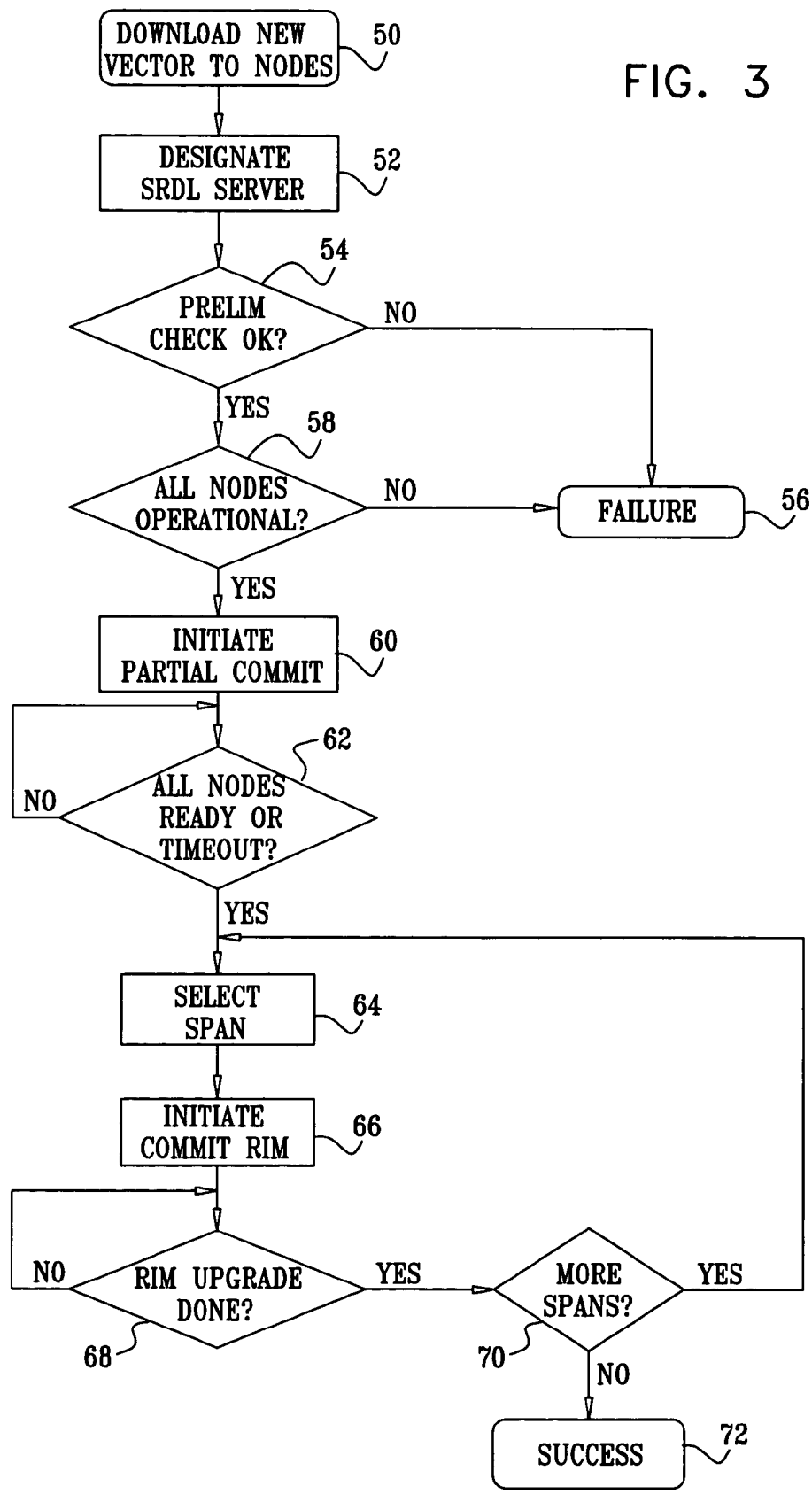
FIG. 3 is a flow chart of a method of synchronized download of software in a ring network in accordance with a disclosed embodiment of the invention.

Reference is now made to FIG. 3, which is a flow chart of a method of synchronized download of software in a ring network in accordance with a disclosed embodiment of the invention. The steps are shown in a particular sequence for clarity of presentation, in order to facilitate understanding of the invention. However, many of the steps can be performed in parallel.

The method begins at initial step 50. A new software release, typically provided as a compressed archive that includes files required for installation, is loaded into the individual memories of the nodes of the ring that are to receive new software. Typically, the software release is stored on a hard disk in the nodes.

Next, at step 52, one of the nodes on the ring is designated as a SRDL server. This can be done by the network EMS (not shown) or by an operator. Alternatively, the SRDL server may reside outside of the ring. It may even be the EMS itself. It is only required that the SRDL server have data connectivity with the other client nodes. The SRDL server has responsibilities for coordinating the process, as described in further detail hereinbelow. The SRDL server is furnished a list of nodes to be upgraded. The SRDL server itself may or may not be included in the list In order to protect against a failure of the SRDL server during the SRDL procedure, a "keep-alive mechanism" is implemented between the SRDL server and the other nodes Every 30 seconds, the SRDL server sends a "Hello" message to all the nodes, and each node responds with its current SRDL status. When a node fails to respond to the Hello messages within the timeout interval, or does not acknowledge commit commands, its SRDL status at the SRDL server is set to "Client-CommLoss".

As the SDRL progresses, status information is maintained separately in the SRDL server and in the nodes. The SRDL server holds a table with the last status received from each client, and in addition, it maintains information indicating the status of the SRDL process in aggregate. A list of status information is presented in Listing 1.

Control now proceeds to decision step 54, where, as a preliminary readiness check, the SRDL server that was appointed in step 52 determines if the ring network is generally in condition to accept the specified software upgrade. The conditions to be fulfilled are as follows: (1) The list of nodes to be upgraded is not empty. (2) All the nodes in the list exist, and have a data communication with the SRDL server. (3) There is no active protection event in the ring. (4) A SRDL is not already in progress.

If the determination at decision step 54 is negative, then control proceeds to final step 56. At this point, the SRDL server notifies the EMS or operator of the outcome by setting its SRDL status to "Failure", and the procedure terminates.

If the determination at decision step 54 is affirmative, then control proceeds to decision step 58.

At decision step 58, the readiness of individual nodes of the ring is evaluated. All nodes may be queried simultaneously. The SRDL server then awaits a response from all the nodes, with a timeout of 30 seconds. The following readiness conditions must be met: (1) The node has two operational MPM's. (2) No other SRDL process is in progress, i.e., the SRDL status of the node is "Idle", "Success" or "Failure" (3) No software download is in progress. (4) In SONET or SDH compliant rings capable of performing synchronized ring bandwidth change (SRBC), SRBC cannot be in progress. SRBC is disclosed in commonly assigned application Ser. No. 10/387,657, entitled Ring Network With Variable Rate, which is herein incorporated by reference. Depending on these conditions, each node indicates its status to the SRDL server by setting its SRDL status to "Started" or "Failure" as the case may be. Once a node has changed its SRDL status to "Started" it rejects commit commands that would interfere with the SRDL, i.e., "Commit SWDL", "Commit SRDL", "Commit SRBC", and commands to set its administrative status to "Down" or "Reset". This block continues until the SRDL process is completed, indicated by a SRDL status of "Success", "Failure", or expiration of a keep-alive timeout. The keep-alive timeout is an interval during which the SRDL server issues five "Hello" messages.

If the determination at decision step 58 is negative then it is concluded that the software upgrade cannot be performed as specified at this time. Control proceeds to final step 56, and the process terminates.

If the determination at decision step 58 is affirmative, control proceeds to step 60. The SRDL server commands the nodes to be upgraded to perform an operation known as a "partial commit". Each of the nodes responds by performing an upgrade of its MPM's and UIM's, if applicable, in accordance with the software release that was downloaded in initial step 50, as is disclosed in further detail hereinbelow. The server verifies that the nodes received the partial commit command by waiting, with a timeout of one second, for a "Commit partial acknowledge" message from each node. If the timeout expires, the server should query the unresponsive nodes three more times before giving up.

Control now passes to delay step 62. Each node signals the SRDL server when it has completed the actions required by the partial commit command. The partial commit actions are detailed below. The server waits, with a timeout of 15 minutes, for a completion of the partial commit command by all the nodes. The commit completion is indicated by a response to the server keep-alive messages with a SRDL status value of "Partial commit success" or "Partial commit failed". If timeout occurs, the SRDL server sets the status of the nodes that haven't responded yet to "Autonomous". The server stops sending "Hello" messages to such autonomous nodes. It is assumed that they will upgrade their RIM's autonomously.

Next, at step 64, the SRDL server begins scanning the ring to select a span in which at least one of the terminal nodes has a SRDL status of "partial commit success".

Then, at step 66, the SRDL server issues a command "Commit RIM" to each of the two terminal nodes of the selected span, provided that the SRDL status is "Partial commit success", "East RIM commit success" or "West RIM commit success", in order to upgrade each RIM that is connected in the selected span. It will be noted from the discussion of step 64 that the SRDL status of at least one of these nodes is guaranteed to be "partial commit success". This command should include an additional parameter, i.e., the eastern RIM or the western RIM. The server then verifies that the nodes received the "Commit RIM" command by waiting, with a timeout of one second, for a "Commit RIM acknowledge" message from each node. If the timeout expires, the server queries the unresponsive nodes for a total of three attempts. It then gives up, and searches for another span.

Referring again to the example of FIG. 2, if the span 28 were selected, the nodes 18, 20 would be commanded to upgrade the eastern ring interface module 40 and the western ring interface module 38, respectively. The western ring interface module 38 of the node 18 and the eastern ring interface module 40 of the node 20 would not be upgraded at this stage.

Returning to FIG. 3, control now passes to delay step 68. The two nodes signal the SRDL server when the RIM upgrades are complete. The SRDL server waits, with a timeout of two minutes, until the two nodes have reported recovery of their respective RIM to an operational state. While the RIM's are in the process of being upgraded, the span is non-operational. However, the ring continues to handle traffic transparently to its users, by automatically wrapping the traffic as necessary to avoid the current span. Because the ring is upgraded a span at a time, no node is ever entirely off line. Returning to the example of FIG. 2, during RIM upgrade, while the span 28 is non-operational, the nodes 18, 20 can still process traffic via the western ring interface module 38, the eastern ring interface module 40, and the user interface module 42. Upon completion of delay step 68, the current span is restored to normal operation.

During delay step 68 a number of actions are taken by each node of the selected span. First, as noted above a "Commit RIM acknowledge" message is sent to the SRDL server. The node then checks whether the indicated RIM really needs to be upgraded by comparing its current software release version with that of the downloaded software release. If a RIM upgrade is not needed because the vectors are the same, the SRDL status is set to "EastRimCommitSuccess" or "WestRimCommitSuccess" as the case may be.

If the versions of the software releases are indeed different, upgrade of the indicated RIM is initiated. According to the result of the upgrade operation, the node sets its SRDL status to "EastRimCommitSuccess", "WestRimCommitSuccess", "EastRimCommitFailure", or "WestRimCommitFailure" to indicate success or failure, respectively of the upgrade operation. In the case where the non-indicated RIM has previously been upgraded, and thus, the indicated RIM is the second RIM of the node to be upgraded, the SRDL status is set to "Success". This status indicates that both RIM's of the node have been successfully upgraded.

Control now passes to decision step 70, where a determination is made whether more ring spans need to be upgraded. If the determination at decision step 70 is affirmative, then control returns to step 64 in order to process another span.

If the determination at decision step 70 is negative, then RIM upgrade is complete for the ring, and control proceeds to final step 72. At this point, the SRDL server notifies the EMS or operator of the outcome by setting its own SRDL status to "Success". The ring is now fully restored to normal operation under the upgraded software, and the procedure terminates successfully.

It will be evident from a consideration of the foregoing method that the ring network is operational at all times, except for the span currently selected for upgrade. The nodes at the end of the current span are serviced by automatically wrapping traffic flow.

When a node having a SRDL status of "Partial commit success", "East RIM commit success", "West RIM commit success", "East RIM commit failure" or "West RIM commit failure" loses its connection with the SRDL server or receives a command to abort the SRDL, it continues with the process autonomously, and upgrades both of its RIM's to the current software release. The node sets its SRDL status to "Autonomous". This behavior avoids the possibility of a steady state in which a node is partially upgraded.

EXAMPLE

Figure 4:
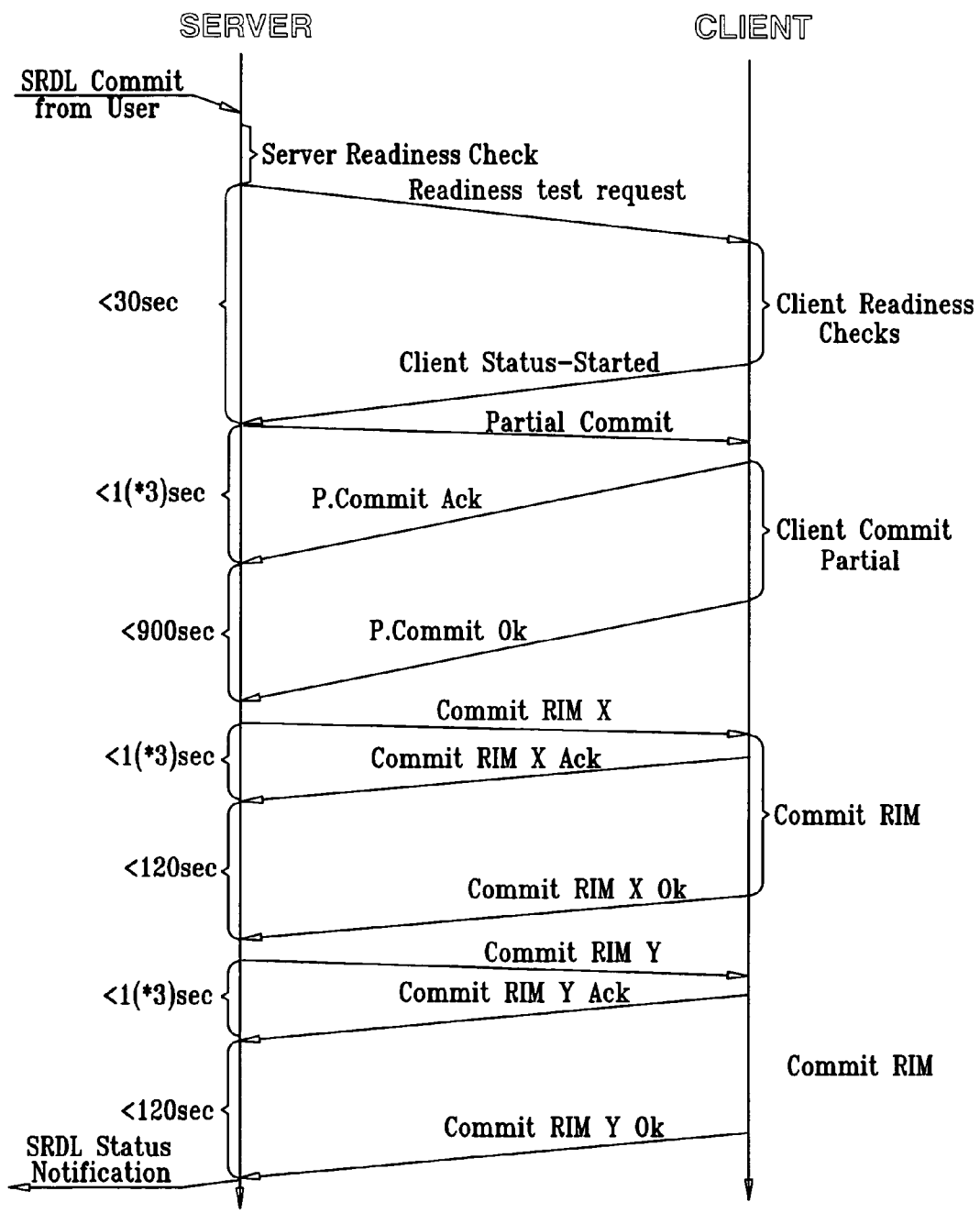
FIG. 4 is a flow chart summarizing interchanges between a SRDL server and a client node using the method shown in FIG. 3 in accordance with a disclosed embodiment of the invention.

Reference is now made to FIG. 4, which is a flow chart summarizing the interchange between the SRDL server and a client node when the process described above with reference to FIG. 3 is performed successfully in accordance with a disclosed embodiment of the invention. Commands initiated by the SRDL server are indicated by rightward-directed arrows. Responses by the client node are shown as leftward-directed arrow.

SRDL-Partial Commit Details.

Figure 5:
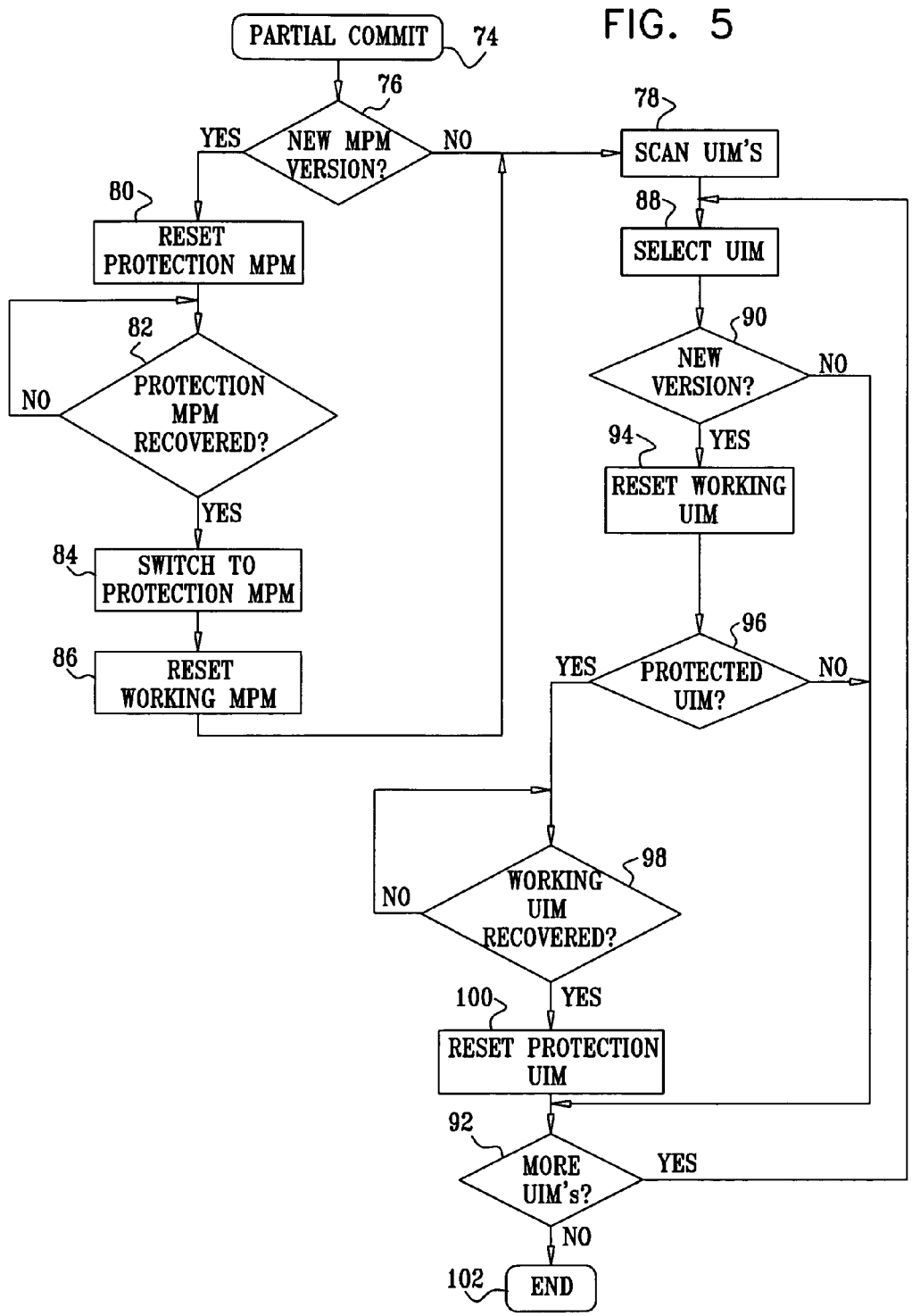
FIG. 5 is a flow chart of certain actions taken by a node undergoing a MPM and UIM upgrade, in accordance with a disclosed embodiment of the invention.

In general, the approach to upgrade the MPM's and UIM's in a node is to upgrade one module of a pair of protected modules at a time. Reference is now made to FIG. 5, which is a flow chart of the actions taken by a node undergoing a MPM and UIM upgrade in accordance with a disclosed embodiment of the invention. At initial step 74 a partial commit command is received from the SRDL server, indicating that only the MPM's and UIM's of the node are to be upgraded.

Control now proceeds to decision step 76, where it is determined if there has been a change in the MPM software release for the node. If the determination at decision step 76 is negative, then control proceeds to step 78, which is described below.

If the determination at decision step 76 is affirmative, then control proceeds to step 80. The protection, or standby MPM of the node is reset.

Control now proceeds to delay step 82, where recovery of the protection MPM is awaited. When the protection MPM has recovered, it begins executing the new software.

Next, at step 84, a switch to the protection MPM is performed.

Next, at step 86 the working MPM is reset automatically.

Step 78 is performed by the protection MPM following completion of step 86, or by the working MPM, if the determination at decision step 76 is negative. The UIM's are scanned.

Next, at step 88, one of the UIM's identified in the scan of step 78 is selected.

Control now proceeds to decision step 90, where it is determined if the selected UIM has a new software release, based on the download in initial step 50 (FIG. 3). If the determination at decision step 90 is negative, then control proceeds to decision step 92, which is described below.

If the determination at decision step 90 is affirmative, then control proceeds to step 94. The working UIM is reset. When it recovers, it will begin executing the new software release.

Control now proceeds to decision step 96, where it is determined if a protection UIM exists for the currently selected UIM. If the determination at decision step 96 is negative, then control proceeds directly to decision step 92, which is described below.

If the determination at decision step 96 is affirmative, then control proceeds to delay step 98, where recovery of the working UIM is awaited. During the delay interval, in those cases where there has been a change in the MPM software (the determination at decision step 76 is affirmative), the currently selected working and protection UIM's are essentially ignored by the MPM. The MPM forbids any configuration changes to the working UIM and the protection UIM. The MPM does not collect performance counters from the UIM, and it ignores any notifications sent by the UIM. Disregarding the current UIM is necessary, because at this point, the MPM is running new software, and the protection UIM still runs an old version.

After completion of delay step 98, the protection UIM is reset at step 100. When the protection UIM recovers, it will execute the new UIM software.

Control now proceeds to decision step 92, where it is determined if there are more UIM's in the current node to be processed. If the determination at decision step 92 is affirmative, then control returns to step 88.

If the determination at decision step 92 is negative, then control proceeds to final step 102, and the procedure terminates.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

Listing 1

```
-- © Corrigent Systems
    Status maintained in client nodes and in server
    per client node.
--
SrdlClientStatus ::= TEXTUAL-CONVENTION
    STATUS current
    DESCRIPTION
        " The current status of the SRDL process
        at a client.
        Idle
        The node was never a SRDL client or SRDL commit
        was not performed yet.
        Success
        The last SRDL process has completed successfully.
        Started
        SRDL process is being performed at the moment and
        the initial sanity checks were passed.
        RejectedNo2OperMpms
        SRDL failed because there were no 2 fully
        operational MPMs at the client.
        PartialCommitSuccess
        The MPMs and UIMs were upgraded successfully.
        PartialCommitFailure
        Failed to upgrade the MPMs or one of the UIMs.
        EastRimCommitSuccess, WestRimCommitSuccess
        The east/west RIM was upgraded successfully.
        EastRimCommitFailure, WestRimCommitFailure
        Failed to upgrade the east/west RIM.
        Autonomous
        The node lost communication with the SRDL server.
        bothRimCommitFailure
        Failed to upgrade both east and west RIMs.
        RejectedOtherSrdl
        SRDL failed because there was other SRDL
        process in progress at the client.
        RejectedSwdlInProgress
        SRDL failed because there was SWDL in progress at
        the client.
        RejectedSrbcInProgress
        SRDL failed because there was SRBC in progress at
        the client."
    SYNTAX INTEGER
        {
        idle                    (0),
        success                 (1),
        started                 (2),
        rejectedNo2OperMpms     (3),
        partialCommitSuccess    (4),
        partialCommitFailure    (5),
        eastRimCommitSuccess    (6),
        westRimCommitSuccess    (7),
        eastRimCommitFailure    (8),
        westRimCommitFailure    (9),
        autonomous              (10),
        bothRimCommitFailure    (11),
        rejectedOtherSrdl       (12),
        rejectedSwdlInProgress  (13),
        rejectedSrbcInProgress  (14)
        }
--
-- Aggregated status kept in SRDL server only.
--
        corSrdlCommitStatus OBJECT-TYPE
            SYNTAX INTEGER
                {
                success         (1),
                inProgress      (2),
                ringFailure     (3),
                invalidNode     (4),
                clientReject    (5),
                clientFailure   (6),
                clientCommLoss  (7),
                otherFailure    (8)
                }
```

-continued

Listing 1

```
            MAX-ACCESS read-only
            STATUS          current
        DESCRIPTION
            " The current status of the SRDL process at the
            server.
                The initial value should be success(1).
                Success
                The SRDL process has completed successfully.
                InProgress
                SRDL process is being performed at the
                moment.
                RingFailure
                The SRDL process failed due to RPR protection
                event on the ring.
                InvalidNode
                The SRDL process failed because one of the
                provisioned nodes was not found in the actual
                RPR topology of the server.
                ClientReject
                The SRDL process failed because the sanity
                checks in one of the client nodes were not
                passed.
                ClientFailure
                The SRDL process failed due to commit failure
                in one of the client nodes.
                ClientCommLoss
                The SRDL process failed due to communication
                loss with one of the client nodes.
                OtherFailure
                The SRDL process failed due to other type of
                error not mentioned above."
            ::= { corSwdlScalarObjects 5 }
```

The invention claimed is:

1. A method for performing software upgrade in a data network having a plurality of nodes interconnected in a ring, said nodes having two ring interface modules, comprising the steps of:

downloading a software release to at least a first node and a second node that are connected by a span;

disabling a flow of data across exactly one internodal connection in said span between one of said ring interface modules of said first node and one of said ring interface modules of said second node;

installing said software release in said one ring interface module of said first node and in said one ring interface module of said second node while said flow of data across said one internodal connection is disabled; and thereafter reestablishing said flow of data across said one internodal connection.

2. The method according to claim 1, wherein said nodes each comprise two main processing modules, further comprising the steps of:

while controlling operation of one of said nodes with one of said main processing modules, installing said software release in another of said main processing modules; and thereafter controlling operation of said one node with another of said main processing modules and installing said software release in said one main processing module.

3. The method according to claim 1, wherein at least a portion of said nodes each have two user interface modules, and said software release comprises new software for said user interface modules, further comprising the steps of:

in said portion of said nodes, while maintaining operation of one of said user interface modules thereof, concurrently installing said software release in another of said user interface modules, and thereafter enabling said another user interface module and installing said software release in said one user interface module.

4. The method according to claim 1, further comprising the steps of:
   appointing a server node from among said nodes; and
   synchronizing said steps of downloading a software release and installing said software release by transmitting commands from said server node to said nodes and performing said steps of downloading a software release and installing said software release responsively to said commands.

5. A computer software product, including a computer storage medium in which computer program instructions are stored, which instructions, when executed by one or more processors in nodes of a data network, wherein said nodes are connected in a ring, each of said nodes having two ring interface modules, cause the processors to execute a method for performing software upgrade in said nodes, the method comprising the steps of:
   downloading a software release to at least a first node and a second node that are connected by a span;
   disabling a flow of data across exactly one internodal connection in said span between one of said ring interface modules of said first node and one of said ring interface modules of a said second node;
   installing said software release in said one ring interface module of said first node and in said one ring interface module of said second node while said flow of data across said one internodal connection is disabled; and
   thereafter reestablishing said flow of data across said one internodal connection.

6. The computer software product according to claim 5, wherein said nodes each have two main processing modules, the method further comprising the steps of:
   while controlling operation of one of said nodes with one of said main processing modules, installing said software release in another of said main processing modules; and
   thereafter controlling operation of said one node with another of said main processing modules and installing said software release in said one main processing module.

7. The computer software product according to claim 5, wherein at least a portion of said nodes each has two user interface modules, and said software release comprises new software for said user interface modules, further comprising the steps of:
   in said portion of said nodes, while maintaining operation of one of said user interface modules thereof, concurrently installing said software release in another of said user interface modules, and thereafter enabling said another user interface module and installing said software release in said one user interface module.

8. The computer software product according to claim 5, wherein one of said processors is further instructed to perform the steps of:
   appointing a server node from among said nodes; and
   wherein another of said processors in said server node is instructed to synchronize said steps of downloading a software release and installing said software release by transmitting commands from said server node to said nodes and performing said steps of downloading a software release and installing said software release responsively to said commands.

9. A communications apparatus comprising a data network having a plurality of nodes interconnected in a ring, said nodes having two ring interface modules, processors in said nodes being operative for performing a method of software upgrade in said nodes, comprising the steps of:
   downloading a software release to at least a first node and a second node that are connected by a span;
   disabling a flow of data across exactly one internodal connection in said span between one of said ring interface modules of said first node and one of said ring interface modules of said second node;
   installing said software release in said one ring interface module of said first node and in said one ring interface module of said second node while said flow of data across said one internodal connection is disabled; and
   thereafter reestablishing said flow of data across said one internodal connection.

10. The communications apparatus according to claim 9, wherein said nodes each comprise two main processing modules, the method further comprising the steps of:
    while controlling operation of one of said nodes with one of said main processing modules, installing said software release in another of said main processing modules; and
    thereafter controlling operation of said one node with another of said main processing modules and installing said software release in said one main processing module.

11. The communications apparatus according to claim 9, wherein at least a portion of said nodes each have two user interface modules, and said software release comprises new software for said user interface modules, further comprising the steps of:
    in said portion of said nodes, while maintaining operation of one of said user interface modules thereof, concurrently installing said software release in another of said user interface modules, and thereafter enabling said another user interface module and installing said software release in said one user interface module.

12. The communications apparatus according to claim 9, wherein one of said nodes is a server node that is operative to synchronize said steps of downloading a software release and installing said software release by transmitting commands from to said nodes and to receive responses from said nodes so as to cause said nodes to download said software release and install said software release responsively to said commands.

13. A method for performing software upgrade in a data network having a plurality of nodes interconnected in a ring, said nodes having two ring interface modules, spans of said ring being defined by a direct internodal connection between an eastern ring interface module of a first node, and a western ring interface module of a second node, wherein said nodes each have two main processing modules, and a software release comp rises new software for said main processing modules, comprising the steps of:
    concurrently in each of said nodes, while maintaining operation of said eastern ring interface module, said western ring interface module and one of said main processing modules, installing said software release in another of said main processing modules, and thereafter enabling said another main processing module and installing said software release an said one main processing module.

14. The method according to claim 13, wherein said step of installing said software release in said main processing modules comprises resetting said main processing modules.

15. The method according to claim 13, wherein said nodes each have two main processing modules, at least a portion of said nodes has a user interface module, and said software release comprises new software for said user interface module, further comprising the steps of:

in said portion of said nodes, while maintaining operation of said ring interface modules and one of said main processing modules, concurrently installing said software release in said user interface module.

16. The method according to claim 13, wherein at least a portion of said nodes each have two user interface modules comprising a working user interface module, and a standby user interface module, and said software release comprises new software for said working user interface module, further comprising the steps of:

in said portion of said nodes, while maintaining operation of one of said user interface modules, concurrently installing said software release in another of said user interface modules, and thereafter enabling said another user interface module and installing said software release in said one user interface module.

17. The method according to claim 16, wherein said step of installing said software release in said user interface modules comprises resetting said user interface modules.

18. The method according to claim 13, further comprising the steps of:

appointing a server node from among said nodes; and synchronizing said steps of downloading a software release and installing said software release by transmitting commands from said server node to said nodes and performing said steps of downloading a software release and installing said software release responsively to said commands.

19. A computer software product, including a computer storage medium in which computer program instructions are stored, which instructions, when executed by one or more processors, cause the processors to perform a method for performing software upgrade in a data network having a plurality of nodes interconnected in a ring, said nodes having two ring interface modules, spans of said ring being defined by a direct internodal connection between an eastern ring interface module of a first node, and a western ring interface module of a second node, wherein said nodes each have two main processing modules, and a software release comprises new software for said main processing modules, comprising the steps of:

concurrently in each of said nodes, while maintaining operation of said eastern ring interface module, said western ring interface module and one of said main processing modules, installing said software release in another of said main processing modules, and thereafter enabling said another main processing module and installing said software release in said one main processing module.

20. The computer software product according to claim 19, wherein said step of installing said software release in said main processing modules comprises resetting said main processing modules.

21. The computer software product according to claim 19, wherein said nodes each have two main processing modules and at least a portion of said nodes each have a user interface module, and said software release comprises new software for said user interface module, the method further comprising the steps of:

in said portion of said nodes, while maintaining operation of said ring interface modules and one of said main processing modules, of concurrently installing said software release in said user interface module.

22. The computer software product according to claim 19, wherein at least a portion of said nodes each have two user interface modules comprising a working user interface module, and a standby user interface module, and said software release comprises new software for said working user interface module, the method further comprising the steps of:

in said portion of said nodes, while maintaining operation of one of said user interface modules, concurrently installing said software release in another of said user interface modules, and thereafter enabling said another user interface module and installing said software release in said one user interface module.

23. The computer software product according to claim 22, wherein said step of installing said software release in said user interface modules comprises resetting said user interface modules.

24. The computer software product according to claim 19, the method further comprising the steps of:

appointing a server node from among said nodes; and synchronizing said steps of downloading a software release and installing said software release by transmitting commands from said server node to said nodes and performing said steps of downloading a software release and installing said software release responsively to said commands.

25. A communications apparatus comprising a data network having a plurality of nodes interconnected in a ring, said nodes having two ring interface modules, spans of said ring being defined by a direct internodal connection between an eastern ring interface module of a first node, and a western ring interface module of a second node, wherein said nodes each have two main processing modules, and a software release comprises new software for said main processing modules, processors in said nodes being operative for performing software upgrade in said nodes comprising the steps of:

concurrently in each of said nodes, while maintaining operation of said eastern ring interface module, said western ring interface module and one of said main processing modules, downloading and installing said software release in another of said main processing modules of said span, and thereafter enabling said another main processing module and installing said software release in said one main processing module.

26. The communications apparatus according to claim 25, wherein said step of installing said software release in said main processing modules comprises resetting said main processing modules.

27. The communications apparatus according to claim 25, wherein said nodes each have two main processing modules, at least a portion of said nodes each have a user interface module, and said software release comprises new software for said user interface module, the method further comprising the steps of:

in said portion of said nodes, while maintaining operation of said ring interface modules and one of said main processing modules, concurrently installing said software release in said user interface module.

28. The communications apparatus according to claim 25, wherein at least a portion of said nodes each have two user interface modules comprising a working user interface module, and a standby user interface module, and said software release comprises new software for said working user interface module, the method further comprising the steps of:

in said portion of said nodes, while maintaining operation of one of said user interface modules, concurrently installing said software release in another of said user interface modules, and thereafter enabling said another user interface module and installing said software release in said one user interface module.

29. The communications apparatus according to claim 28, wherein said step of installing said software release in said user interface modules comprises resetting said user interface modules.

30. The communications apparatus according to claim 25, wherein one of said nodes is a server node that is operative to synchronize said steps of downloading a software release and installing said software release by transmitting commands from to said nodes and to receive responses from said nodes so as to cause said nodes to download said software release and install said software release responsively to said commands.

31. A method for performing software upgrade in a data network having a plurality of spans interconnected in a ring said spans each connecting terminal nodes including a first terminal node to a second terminal node, said terminal nodes having two main processing modules and two ring interface modules, comprising the steps of:

downloading a software release to, said terminal nodes, said software release including software for said main processing modules and said ring interface modules;

while controlling operation of each of said terminal nodes with one of said main processing modules, respectively, concurrently installing said software release in another of said main processing modules; and thereafter respectively controlling operation of said terminal nodes with another of said main processing modules and installing said software release in said one main processing module;

thereafter performing the further steps of:

iteratively for each of said spans, disabling a flow of data across exactly one internodal connection between said one of said ring interface modules of said first terminal node and one of said ring interface modules of said second terminal node thereof;

installing said software release in said one ring interface module of said first terminal node while said flow of data across said one internodal connection is disabled; and thereafter reestablishing said flow of data across said internodal connection.

32. A computer software product, including a computer storage medium in which computer program instructions are stored, which instructions, when executed by one or more processors in nodes of a data network, wherein said nodes are connected in a ring by spans, each of said nodes having two ring interface modules, and two user interface modules cause the processors to execute a method for performing software upgrade in said nodes, the method comprising the steps of:

downloading a software release to each of said nodes, said software release including software for said user interface modules and said ring interface modules;

while controlling operation of each of said nodes with one of said user interface modules, respectively, concurrently in each of said nodes installing said software release in another of said user interface modules; and thereafter controlling operation of said one node with another of said main processing modules and installing said software release in said one main processing module;

thereafter performing the further steps of: iteratively in each of said spans disabling a flow of data across exactly one internodal connection between said one of said ring interface modules of said first node and one of said ring interface modules of a second node;

installing said software release in said one ring interface module of said first node while said flow of data across said one internodal connection is disabled; and thereafter reestablishing said flow of data across said internodal connection.

33. A method for performing software upgrade in a data network having a plurality of nodes interconnected in a ring, said nodes having ring interface modules, two main processing modules and at least a portion of said nodes having two user interface modules, said ring interface modules, said main processing modules, and said user interface modules operated by software comprising the steps of:

downloading a software release to each of said nodes, wherein said software release comprises new software for said main processing modules and said user interface modules, in said portion of said nodes, while maintaining operation of said ring interface modules using a current version of said software thereof, and while maintaining operation of one of said main processing modules and said user interface modules thereof, concurrently performing a partial upgrade by installing said software release in another of said main processing modules and said user interface modules, and thereafter enabling said another of said main processing modules and said another of said user interface modules and installing said software release in said one of said main processing modules and said one of said user interface modules.

* * * * *